(12) United States Patent
Bortoli et al.

(10) Patent No.: US 11,754,131 B2
(45) Date of Patent: Sep. 12, 2023

(54) WET BRAKE SYSTEM AND METHOD OF OPERATING A WET BRAKE SYSTEM

(71) Applicant: DANA ITALIA S.R.L., Arco (IT)

(72) Inventors: Andrea Bortoli, Trento (IT); Pier Paolo Rinaldi, Arco (IT)

(73) Assignee: DANA ITALIA S.R.L., Arco (IT)

( * ) Notice: Subject to any disclaimer, the term of this patent is extended or adjusted under 35 U.S.C. 154(b) by 182 days.

(21) Appl. No.: 17/018,633

(22) Filed: Sep. 11, 2020

(65) Prior Publication Data

US 2021/0079965 A1 Mar. 18, 2021

(30) Foreign Application Priority Data

Sep. 13, 2019 (EP) .................................... 19197254

(51) Int. Cl.
*F16D 65/853* (2006.01)
*F16D 55/40* (2006.01)
(Continued)

(52) U.S. Cl.
CPC .......... *F16D 55/40* (2013.01); *F16D 65/853* (2013.01); *F16D 2055/0058* (2013.01); *F16D 2069/004* (2013.01)

(58) Field of Classification Search
CPC ...... F16D 65/853; F16D 25/123; F16D 13/72; F16D 2065/783; F16D 2300/021; F16D 2300/014; F16D 2300/06
(Continued)

(56) References Cited

U.S. PATENT DOCUMENTS

| 2,788,870 A | * | 4/1957 | Burnette | F16D 65/853 |
| | | | | 192/113.34 |
| 2,837,181 A | * | 6/1958 | Kelley | F16D 65/853 |
| | | | | 236/34.5 |

(Continued)

FOREIGN PATENT DOCUMENTS

| CH | 346443 A | * | 5/1960 | ........... F16D 65/853 |
| DE | 19648212 A1 | * | 5/1998 | ............. B60T 1/065 |

(Continued)

OTHER PUBLICATIONS

European Patent Office, Extended European Search Report Issued in Application No. 19197254.6, dated Mar. 20, 2020, Germany, 7 pages.

*Primary Examiner* — Nicholas J Lane
*Assistant Examiner* — Stephen M Bowes
(74) *Attorney, Agent, or Firm* — McCoy Russell LLP (57) ABSTRACT

A wet brake system, a method therefor, and a vehicle including such system, the system comprising: a housing enclosing a brake compartment, at least one friction plate rotatably disposed within the brake compartment, at least one separator plate disposed within the brake compartment, coupled to the housing and configured to be frictionally engaged with the at least one friction plate for braking the at least one friction plate, the at least one friction plate and the at least one separator plate configured to be at least partially submersed in a liquid held within the brake compartment, and a liquid reservoir, wherein a drain port is arranged such that the at least one friction plate when rotating is configured to convey liquid held within the brake compartment to the liquid reservoir via the drain port and a drain channel for draining the brake compartment.

19 Claims, 7 Drawing Sheets

(51) Int. Cl.
*F16D 55/00* (2006.01)
*F16D 69/00* (2006.01)

(58) Field of Classification Search
USPC .................. 192/113.35; 188/264 D, 264 E
See application file for complete search history.

(56) References Cited

U.S. PATENT DOCUMENTS

| | | | | |
|---|---|---|---|---|
| 2,986,240 | A * | 5/1961 | Eaton | F16D 55/26 |
| | | | | 188/71.6 |
| 3,036,869 | A * | 5/1962 | Crockett | F16D 55/40 |
| | | | | 188/106 R |
| 3,696,893 | A * | 10/1972 | Koivunen | F16D 65/853 |
| | | | | 188/264 P |
| 6,189,669 | B1 * | 2/2001 | Kremer | F16D 25/123 |
| | | | | 188/71.6 |
| 2011/0000750 | A1 | 1/2011 | Schnell et al. | |
| 2013/0313053 | A1 * | 11/2013 | Andersson | F16H 57/0473 |
| | | | | 188/71.6 |
| 2014/0023543 | A1 | 1/2014 | Attarde et al. | |

FOREIGN PATENT DOCUMENTS

| | | | | | |
|---|---|---|---|---|---|
| GB | | 739244 | A * | 10/1955 | ........... F16D 65/847 |
| JP | | 2002323072 | A * | 11/2002 | |

* cited by examiner

WET BRAKE SYSTEM AND METHOD OF OPERATING A WET BRAKE SYSTEM

CROSS-REFERENCE TO RELATED APPLICATIONS

The present application claims priority to European Patent Application No. 19197254.6, entitled "WET BRAKE SYSTEM AND METHOD OF OPERATING A WET BRAKE SYSTEM", and filed on Sep. 13, 2019. The entire contents of the above-listed application are hereby incorporated by reference for all purposes.

TECHNICAL FIELD

The present document relates primarily to a wet brake system, to a vehicle including the wet brake system, and to a method of operating the wet brake system.

BACKGROUND AND SUMMARY

Wet brake systems for vehicles are generally known for their smooth, progressive and almost wear-free braking action. Known wet brake systems typically include a housing which encloses a brake compartment and a liquid sump formed by or within the brake compartment. The liquid sump is generally filled or at least partially filled with a cooling and/or lubricating liquid such as oil. Usually, a plurality of friction plates coupled to a wheel hub and a plurality of separator plates coupled to the housing are alternatingly disposed within the brake compartment and are at least partially submersed in a liquid held within the liquid sump. For example, the friction plates may be coupled to the wheel hub via a first splined connection that forces the friction plates to rotate with the wheel hub and that allows the friction plates to move in an axial direction defined by the axis of rotation, and the separator plates may be coupled to the housing via a second splined connection that rotationally locks the separator plates to the housing and that allows the separator plates to move in the axial direction. The friction plates and the separator plates may then be frictionally engaged with one another for braking the friction plates and the wheel hub by compressing the alternating friction plates and separator plates in the axial direction. Known wet brake systems typically comprise a brake piston for frictionally engaging the friction plates and the separator plates with one another. The brake piston may be a hydraulically actuatable piston, for example.

A disadvantage of wet brake systems are the power losses caused by the rotating motion of the friction plates submersed in the liquid held within the brake compartment. These power losses depend linearly on the viscosity of the liquid in which the friction plates are submersed, quadratically on the rotational speed of the friction plates. Further, these power losses are inversely proportional to the width of the gaps formed in between the friction plates and the separator plates. In most cases, widening the gap in between the friction plates and the separator plates is not feasible as the longer stroke resulting from the increased gap width would result in a delayed response when braking. And while reducing the viscosity of the cooling or lubricating liquid could potentially reduce power losses, it diminishes the lubrication capability and the heat conductance of the liquid, both of which is undesirable in many applications.

Thus, there is demand for a wet brake system with good energy efficiency and longevity.

This object is addressed by a wet brake system including the features of embodiments described herein, by a vehicle comprising said wet brake system, and by a method of operating said wet brake system.

According to various embodiments described, the presently proposed wet brake system comprises:

i. a housing enclosing a brake compartment configured to hold a liquid, for example in a first liquid sump formed within the brake compartment, at least one friction plate rotatably disposed within the brake compartment, at least one separator plate disposed within the brake compartment, coupled to the housing and configured to be frictionally engaged with the at least one friction plate for braking the friction plate, the at least one friction plate and the at least one separator plate configured to be at least partially submersed in a liquid held within the brake compartment, and i. a liquid reservoir in fluid communication with the brake compartment via a drain channel, the drain channel ending in a drain port disposed in the brake compartment, wherein the drain port is arranged such that the at least one friction plate when rotating is configured to convey liquid held within the brake compartment to the liquid reservoir via the drain port and the drain channel for draining the brake compartment.

The fact that the drain port is arranged such that the at least one friction plate when rotating is configured to convey liquid held within the brake compartment to the liquid reservoir via the drain port and the drain channel for draining the brake compartment facilitates draining the liquid held within the brake compartment to the liquid reservoir, typically when the at least one friction plate and the at least one separator plate are not frictionally engaged, that is when friction between the plates and heat production are at a minimum. Depleting or partially depleting the brake compartment by draining the liquid or at least some of the liquid held within the brake compartment to the liquid reservoir through the rotating motion of the at least one friction plate can greatly reduce viscous losses and increase the efficiency of the system. Typically, the at least one friction plate may convey liquid from the brake compartment or from the first liquid sump formed within the brake compartment toward the drain port and into the drain channel at a sufficient rate simply by means of the centrifugal forces it imparts onto the liquid through its rotating motion.

The rotatable friction plate or friction plates usually define an axis of rotation. The coupling between the at least one separator plate and the housing may be configured to allow the at least one separator plate to move in the axial direction and to provide a torque proof connection between the at least one separator plate and the housing with respect to the axis of rotation. Similarly, the at least one friction plate may be movable in the axial direction. For example, the at least one friction plate and the at least one separator plate may include a plurality of alternating friction plates and separator plates that are movable in the axial direction. In order to frictionally engage the alternating friction plates and separator plates they may then be compressed in the axial direction.

In order to further facilitate the draining of liquid held within the brake compartment or within the first liquid sump through the rotating motion of the at least at least one friction plate, the drain port is preferably arranged such that an axial position of the drain port overlaps or at least partially overlaps with an axial position of the at least one friction plate. In order to further facilitate the conveyor action of the at least one friction plate, the friction plate or the friction plates may comprise conveyor structures formed on a surface of the friction plate or of the friction plates. For example, the conveyor structures may include protrusions extending from the surface of the friction plate, for instance in a radial direction perpendicular to the axis of rotation or in the axial direction.

Additionally, the wet brake system may comprise a deflector element arranged near a perimeter of the at least one friction plate. Typically, the deflector element is mounted on, connected to or formed from an inner wall of the housing, or more specifically on an inner wall of the brake compartment. The deflector element is preferably configured to deflect liquid toward or into the drain port. For example, the deflector element may be bent toward the drain port or may form a channel-like structure that tapers toward the drain port. Usually, the deflector element is configured as an extension of a wall portion of the brake compartment that encloses the drain port on the upper side of the drain port, that is on a side of the drain port averted from the first liquid sump.

It is particularly advantageous if the drain port, the drain channel and the liquid reservoir are arranged such that liquid conveyed into the drain port and into the drain channel can flow into the liquid reservoir under the influence of gravity, preferably solely under the influence of gravity. To that end, the drain port is preferably disposed above a floor of the brake compartment. The floor of the brake compartment may form the above-mentioned first liquid sump and/or may define a lowermost portion of the brake compartment. Further, the drain port is preferably disposed at least partially above the liquid reservoir so that liquid conveyed to or into the drain port may flow from the drain port, through the drain channel and into the liquid reservoir under the influence of gravity, preferably solely under the influence of gravity. That is, a floor of the liquid reservoir forming a second liquid sump and/or defining a lowermost portion of the liquid reservoir is preferably disposed below the drain port. In particular, the drain port may be disposed above the axis of rotation with respect to the floor of the brake compartment or with respect to the first liquid sump.

Nonetheless, the wet brake system may additionally include a drain pump configured to pump liquid from the brake compartment or from the first liquid sump formed within the brake compartment toward the liquid reservoir via the drain port and via the drain channel.

The wet brake system may further include a drain valve device for selectively interrupting fluid communication between the brake compartment and the liquid reservoir via the drain port and the drain channel. The inlet valve device may assist in controlling the amount of liquid held in the liquid reservoir and the amount of liquid held in the brake compartment. For example, the drain valve device may be disposed at the drain port or along the drain channel. The drain valve device may include a normally open valve so that liquid may be conveyed from the brake compartment to the liquid reservoir unless the drain valve device is actuated. For instance, the drain valve device may include a biasing member such as a spring biasing the drain valve device toward an open position. Closing the drain valve device to interrupt fluid communication between the brake compartment and the liquid reservoir may be advantageous before or during braking, that is before or when the friction plates and the separator plates are frictionally engaged with one another and an increased amount of liquid in the brake compartment is desired for cooling and/or for lubricating the frictionally engaged plates.

The wet brake system may further include an inlet valve device which selectively fluidly connects the liquid reservoir with the brake compartment. The inlet valve device typically has an open position in which the inlet valve device provides fluid communication between the liquid reservoir and the brake compartment, and a closed position in which the inlet valve device interrupts fluid communication between the liquid reservoir and the brake compartment. For example, the inlet valve device may allow liquid held within the liquid reservoir to be discharged into the brake compartment or into the first liquid sump before, preferably right before, and/or during frictionally engaging the at least one friction plate with the at least one separator plate. When the inlet valve device is in the open position, it may define an inlet port which is in fluid communication with or is disposed in the brake compartment.

It is particularly advantageous if the liquid reservoir is disposed at least partially above the inlet port defined by the inlet valve device so that liquid may flow from the liquid reservoir into the brake compartment via the inlet port under the influence of gravity, preferably solely under the influence of gravity. For example, the floor of the liquid reservoir may be disposed above the inlet port. In particular, the inlet port may be disposed below the axis of rotation. In other words, the inlet valve device may assist in controlling the amount of liquid held in the liquid reservoir and the amount of liquid held in the brake compartment.

The inlet valve device may include a normally closed valve so that liquid may be held in the liquid reservoir or prevented from being discharged into the brake compartment unless the inlet valve device is actuated. For instance, the inlet valve device may include a biasing member such as a spring biasing the inlet valve device toward a closed position. Opening the inlet valve device to provide fluid communication between the liquid reservoir and the brake compartment may be advantageous before or during braking, that is before or when the friction plates and the separator plates are frictionally engaged with one another and an increased amount of liquid in the brake compartment is desired for cooling and/or for lubricating the frictionally engaged plates.

Nonetheless, the wet brake system may additionally include an inlet pump configured to pump liquid from the liquid reservoir or from the second liquid sump formed within the liquid reservoir toward the brake compartment via the inlet channel and the inlet port.

The wet brake system may comprise a first actuator for selectively frictionally engaging the at least one friction plate with the at least one separator plate. For example, the first actuator may include a hydraulically actuatable piston for selectively compressing the at least one friction plate and the at least one separator plate in the axial direction. Alternatively, the first actuator may include an electromagnetically actuatable actuator, for example.

Additionally or alternatively, the wet brake system may comprise a second actuator for selectively opening the inlet valve device to fluidly connect the liquid reservoir with the brake compartment. The wet brake system may further comprise a coupling mechanism which couples the first actuator with the second actuator. The coupling mechanism may be configured such that when the first actuator actuates the at least one separator plate to frictionally engage with the at least one friction plate, the second actuator actuates the inlet valve device to fluidly connect the liquid reservoir with the brake compartment to allow liquid held in the liquid reservoir to fill the brake compartment via the inlet channel and the inlet port. For example, in some embodiments the coupling mechanism coupling the first actuator and the second actuator may include a mechanical coupling. For instance, the first actuator and the second actuator may be pivotably coupled via a lever portion.

The wet brake system may comprise a rotatable shaft connected to the at least one friction plate or connectable to the at least one friction plate. For example, the rotatable shaft may include an axle shaft or an axle half shaft. The liquid reservoir may then be disposed circumferentially around the rotatable shaft. For instance, the liquid reservoir may be disposed or formed within an axle housing. The axle housing may be formed integrally with the housing of the wet brake system.

Furthermore, a vehicle is presently proposed, the vehicle comprising a vehicle wheel and the above described wet brake system. The friction plate of the wet brake system may then be connected to or in driving engagement with the vehicle wheel.

Further, a method if operating the above-described wet brake system is presently proposed, the method comprising the steps:

when, before or right before frictionally engaging the at least one separator plate with the at least one friction plate, fluidly connecting the liquid reservoir with the brake compartment to allow liquid held in the liquid reservoir to fill the brake compartment, and when the separator plate and the friction plate are disengaged, rotating the friction plate to convey liquid held in the brake compartment to the liquid reservoir via the drain port and the drain channel to drain the brake compartment.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

Embodiments of the presently proposed wet brake system, vehicle and method of operation are described in the following detailed description and are depicted in the figures. The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

Similar reference numerals may have been used in different figures to denote similar components. FIGS. 1, 2, 3A, 3B, 4A, 4B, 5A, 5B, and 6 (i.e., FIGS. 1-6) are shown approximately to scale, according to some embodiments. FIGS. 1-6 are shown with components in proportional size with one another, according to some embodiments.

DETAILED DESCRIPTION

Figure 1:
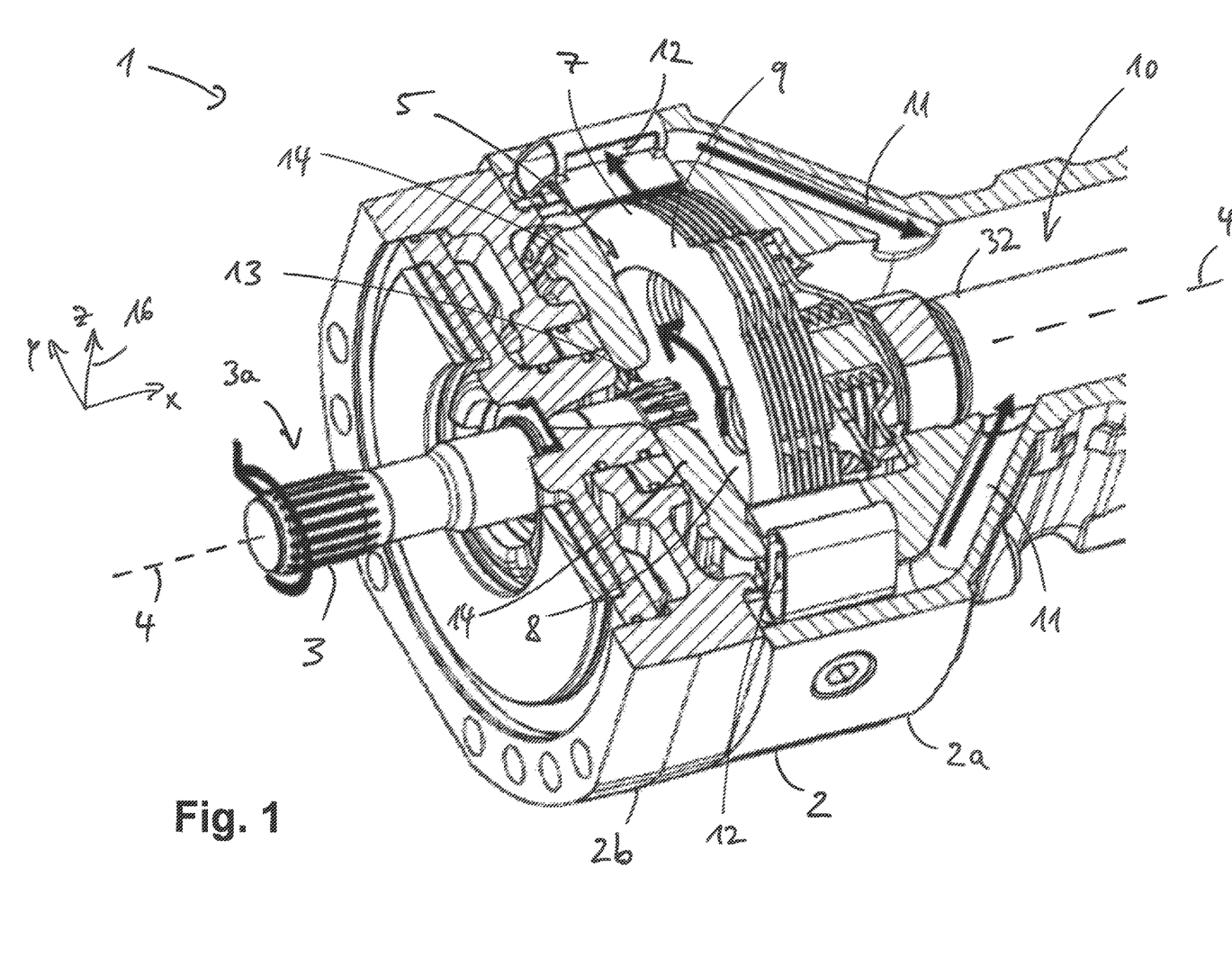
FIG. 1 schematically shows a cutaway perspective view of a wet brake system.
Figure 2:
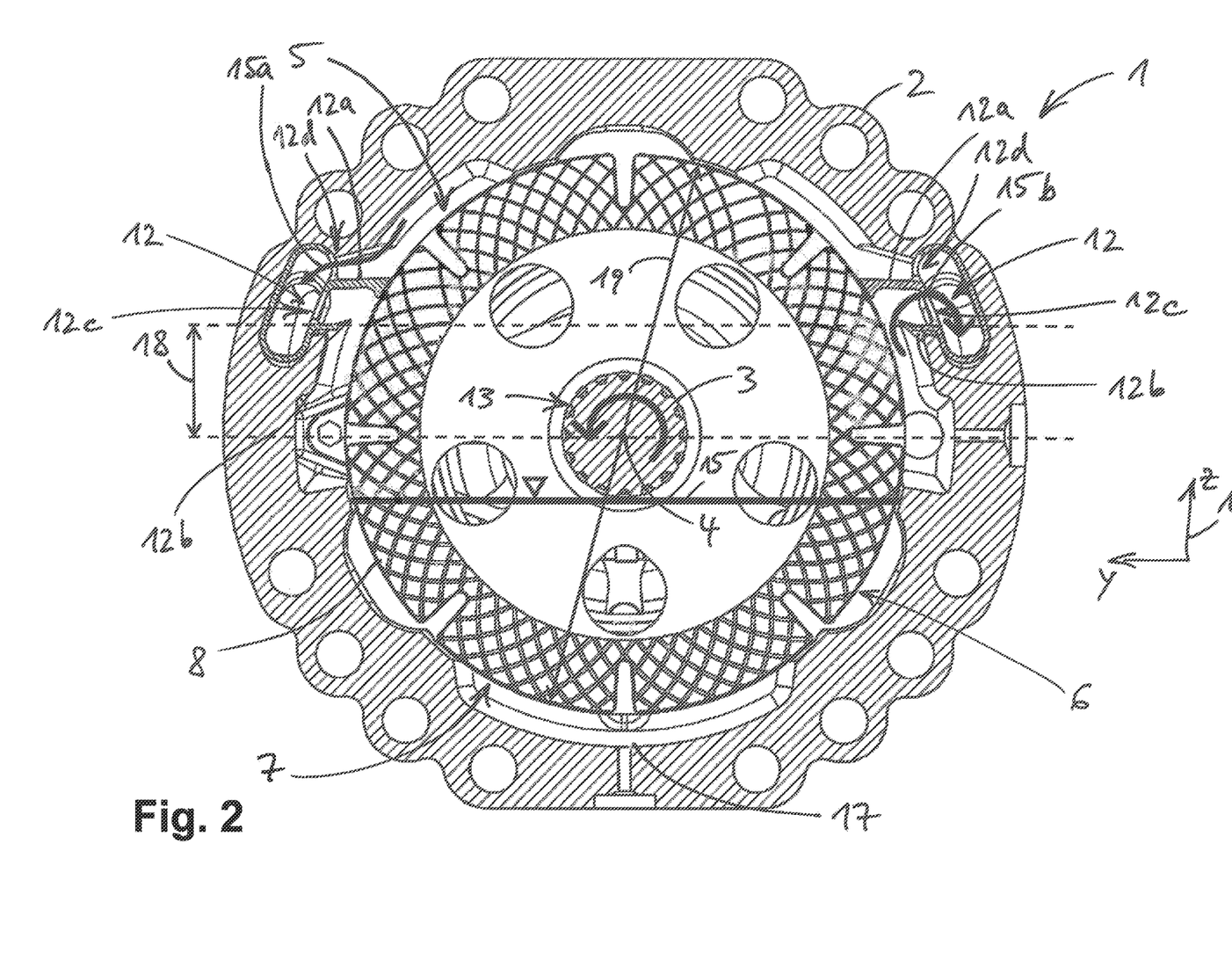
FIG. 2 schematically shows a sectional view of the wet brake system of FIG. 1, wherein the sectional plane is arranged perpendicular to an axis of rotation of the wet brake system.

FIG. 1 schematically shows a perspective cutaway view of wet brake system 1 for a vehicle. FIG. 2 shows a sectional view of the wet brake system of FIG. 1. Here and in all of the following identical features recurring in different figures are designated with the same reference signs.

The wet brake system 1 includes an axle housing 2 and a rotatable shaft 3. The shaft 3 is disposed in and surrounded by a shaft tube 32 arranged within the housing 2. The shaft 3 is an axle half shaft and defines an axis of rotation or x-axis 4. The sectional plane of FIG. 2 is arranged perpendicular to the axis of rotation 4. An end 3a of the shaft 3 protruding out of the axle housing 2 may be in driving engagement with a differential or with a planetary gear set of a differential, for example. The axle housing comprises a main portion 2a and an end portion 2b connected to the main portion 2a, for example by means of bolts and/or screws. It is understood that in alternative embodiments the housing 2 may be formed in a single piece.

The wet brake system 1 further includes a brake compartment 5 formed within the axle housing 2 and forming a liquid sump 6, as indicated in FIG. 2. Here, the brake compartment 5 has an essentially cylindrical shape. It is understood that in alternative embodiments the brake compartment may have other shapes. The wet brake system further comprises a plate pack 7 including friction plates 8 and separator plates 9 alternatingly stacked long the axial direction 4 and disposed on or around the shaft 3, which extends through the brake compartment 5. The wet brake system 1 also comprises a liquid reservoir 10 formed within the main portion 2a of the axle housing 2 and circumferentially disposed around the shaft 3, and drain channels 11 providing fluid communication between the brake compartment 5 and the liquid reservoir 10. Each of the drain channels 11 ends in one of two drain ports 12 disposed in the brake compartment 5.

The friction plates 8 and the shaft 3 are connected or coupled via a splined connection 13. The splined connection 13 provides a torque proof connection between the friction plates 8 and the shaft 3 with respect to the axis of rotation 4 such that the friction plates 8 are forced to rotate with the shaft 3 around the axis of rotation 4. However, the splined connection 13 allows the friction plates 8 to move in the axial direction 4. A similar connection or coupling between the separator plates 9 and the housing 2 provides a torque proof connection between the separator plates 9 and the housing 2 with respect to the axis of rotation 4. However, the connection or coupling between the separator plates 9 and the housing 2 allows the separator plates 9 to move in the axial direction 4.

The wet brake system 1 further includes a brake piston 14 which is configured to move in the axial direction 4 and to compress the plate pack 7 including the friction plates 8 and the separator plates 9 in the axial direction 4 to frictionally engage the plates 8, 9 of the pack 7 with one another for braking the friction plates 8 and the shaft 3. The brake piston 14 may be a hydraulically actuatable piston. It is understood that in alternative embodiments the brake piston 14 may be actuatable by means of electromagnetic forces, for example.

When the liquid sump 6 formed at the bottom of the brake compartment 5 is at least partially filled with a liquid 15, the plates 8, 9 of the plate pack 7 are at least partially submersed in the liquid 15 held within the liquid sump 6. Note that for ease of illustration only, in FIG. 2 the liquid 15 accumulated within the liquid sump 6 of the brake compartment 5 is represented by a horizontal black line indicating the surface of the accumulated liquid 15. The liquid 15 may be a cooling and/or lubricating liquid such as oil. When the plates 8, 9 of the plate pack 7 are at least partially submersed in the liquid 15 held within the liquid sump 6 and the friction plates 8 rotate with the shaft 3, the rotating friction plates 8 impart a force on the liquid 15 sticking on the surface of the friction plates 8. In this way, the rotating friction plates 8 impart a momentum on the liquid 15 that typically has a tangential and a radially outward pointing component, thereby causing the liquid 15 to splash at least partially radially outward from the friction plates 8, as indicated in FIG. 2 at 15a and 15b.

The drain ports 12 face radially inward from axially extending inner walls of the housing 2 which enclose the brake compartment 5 and the liquid sump 6. As can be observed in FIG. 1, the drain ports 12 and the friction plates 8 are arranged such that an axial position of the drain ports 12 overlaps with an axial position of the friction plates 8. Consequently, the rotating friction plates 8 convey the at least partially radially outward splashing liquid 15a, 15b toward and into the drain ports 12 where the liquid 15a, 15b enters the drain channels 11.

Details of the drain ports 12 are depicted in FIG. 2. Specifically, the drain ports 12 each comprise an upper deflector element 12a and a lower deflector element 12b. Each of the deflector elements 12a, 12b includes a planar portion extending from an inner wall of the housing 2 enclosing the brake compartment 5. From said inner wall of the housing 2 the deflector elements 12a, 12b extend towards the plate pack 7 including the plates 8, 9.

The upper deflector element 12a is disposed at or near a perimeter of the friction plates 8. The upper deflector element 12a extends from an upper end of a lower opening 12c of the drain port 12. The upper deflector element 12a is configured to guide liquid 15b splashing upward from the friction plates 8 and toward the drain port 12 into the lower opening 12c of the drain port 12 and into the corresponding drain channel 11. Further, the upper deflector element 12a extends from a lower end of an upper opening 12d of the drain port 12. The upper opening 12d is disposed above the lower opening 12c along a vertical direction or z-direction 16 coinciding with the direction of gravity. The upper deflector element 12a features a downward inclination toward the upper opening 12d of the drain port 12 so that the upper deflector element 12a is configured to guide liquid 15a accumulated on an upper side of the upper deflector element 12a into the upper opening 12d of the drain port 12 and into the corresponding drain channel 11. The x-axis or axial direction 4, a y-axis and the vertical direction or z-direction 16 define a right-handed Cartesian coordinate system, as depicted in the Figures. The x-y-plane may be spanned or defined by the axle half shaft 3 depicted in the Figures and by another axle or axle shaft of the vehicle (not shown).

The lower deflector element 12b is disposed below the upper deflector element 12a and extends from a lower end of the lower opening 12c of the drain port 12. The lower deflector element 12b leaves a clearance between the lower deflector element 12b and the plate pack 7 so that the upward splashing liquid 15b may pass through the clearance and into the lower opening of the drain port 12. The lower deflector element 12b features a downward inclination toward the lower opening 12c of the drain port 12 so that the lower deflector element 12b is configured to guide liquid 15b accumulated on an upper side of the lower deflector element 12b into the lower opening 12c of the drain port 12 and into the corresponding drain channel 11.

In the vertical direction or z-direction 16 the drain ports 12 are disposed above a floor 17 of the brake compartment 5 (FIG. 2). The floor 17 of the brake compartment defines a lowermost portion of the brake compartment 5 and of the liquid sump 6. Specifically, in the vertical direction 16 the drain ports 12 are disposed above the axis of rotation 4 with respect to the floor 17 of the brake compartment 5 or with respect to the liquid sump 6 of the brake compartment 5. For example, in the vertical direction 16 the drain ports 12 are disposed at a distance 18 above the axis of rotation 4 that is at least one sixth or at least one fifth of the length of a maximum diameter 19 of the friction plates 8.

Figure 3A:
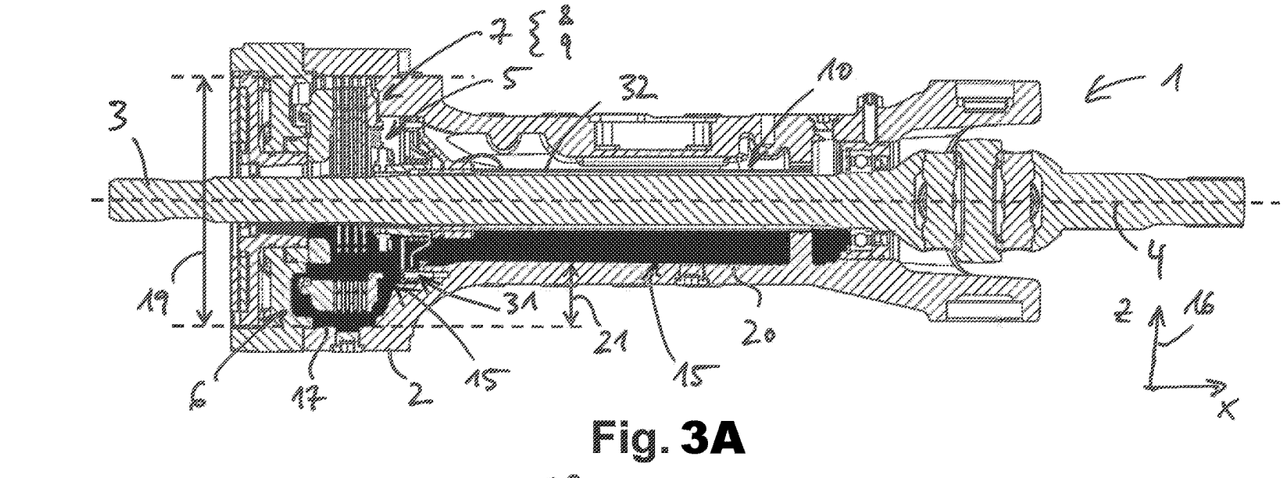
FIG. 3A schematically shows a sectional view of the wet brake system of FIG. 1, wherein a brake compartment is filled with a liquid.
Figure 3B:
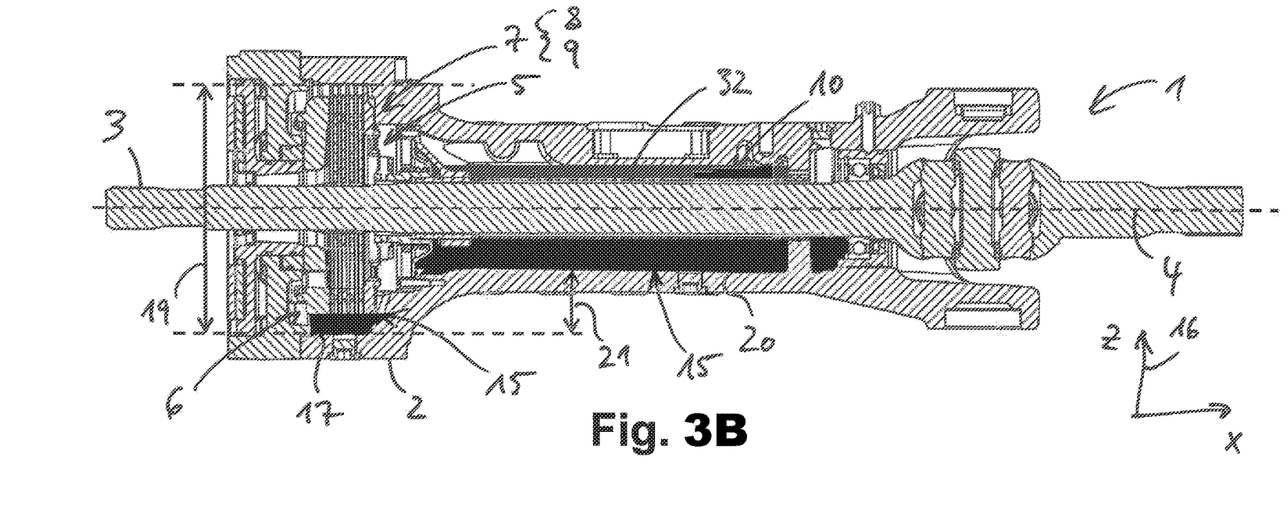
FIG. 3B schematically shows the sectional view of FIG. 3A, wherein the liquid has been at least partially conveyed from the brake compartment into a liquid reservoir.

On the other hand, the liquid reservoir 10 (FIG. 1) is at least partially disposed below the drain ports 12 along the vertical direction 16. Specifically, a floor 20 of the liquid reservoir 10 defining a lowermost portion of the liquid reservoir 10 is disposed below the drain ports 12. For example, the floor 20 of the liquid reservoir 10 is disposed below the axis of rotation 4 along the vertical direction 16. More precisely, in the vertical direction 16 the floor 20 of the liquid reservoir 10 may be disposed at a distance 21 above the floor 17 of the brake compartment 5 that is at most one third or at most one fourth of the length of the maximum diameter 19 of the friction plates 8 (FIGS. 3A, 3B).

Furthermore, the drain channels 11 feature a downward slope all the way from the drain ports 12 to the liquid reservoir 10. In this way, liquid 15 entering the drain channels 11 at the drain ports 12 flows down the downward slope of the drain channels 11 and into the liquid reservoir 10. In other words, liquid 15 may flow from the drain ports 12 and into the liquid reservoir 10 only under the influence of gravity.

In alternative embodiments, the brake system 1 may further include a drain pump (not shown) for pumping liquid 15 from the brake compartment 5 toward or into the liquid reservoir 10. This may speed up the process of draining the brake compartment 5 in certain situations. Additionally or alternatively, the brake system 1 may comprise at least one drain valve (not shown) for selectively interrupting fluid communication between the brake compartment 5 and the liquid reservoir 10 via the drain ports 12 and the drain channels 11, and for preventing the draining of fluid from the brake compartment 5 when the friction plates 8 are rotating. For example, one drain valve may be disposed at each of the drain ports 12 or along each of the drain channels 11. Closing the drain valve or the drain valves may speed up the process of filling the brake compartment.

From FIG. 2 it is apparent that due to the symmetrical arrangement of the two drain ports 12 with respect to the rotation axis 4 on opposite axially extending inner walls of the housing 2, liquid 15a, 15b splashing radially outward from the plate pack 7 may be equally efficiently conveyed into the drain ports 12 irrespective of the direction of rotation of the shaft 3 and the plates 8, 9 of the plate pack 7.

FIGS. 3A and 3B each schematically show a sectional view of the wet brake system 1 of FIG. 1. In both FIG. 3A and FIG. 3B the rotation axis 4 lies within the sectional plane.

FIG. 3A shows a situation where most of the lowermost half of the brake compartment 5 is filled with liquid 15 and the plates 8, 9 of the plate pack 7 are submersed in the liquid 15 held within the liquid sump 6 of the brake compartment 5. Having the plates 8, 9 of the plate pack 7 submersed in the liquid 15 as shown in FIG. 3A is advantageous for cooling and lubricating the plates 8, 9 of the plate pack 7 when the plates 8, 9 of the plate pack 7 are frictionally engaged with one another during braking. However, the situation depicted in FIG. 3A is undesirable when the plates 8, 9 of the plate pack 7 are not frictionally engaged, as the liquid 15 accumulated in the liquid sump 6 of the brake compartment exerts a significant drag on the friction plates 8 when the shaft 3 and the friction plates 8 connected to the shaft 3 are rotating.

FIG. 3B on the other hand shows a situation where most of the liquid 15 has been drained from the brake compartment 5 to the liquid reservoir 10 via the drain ports 12 and the drain channels 11 by means of the above-described conveyor action or pumping action of the rotating friction plates 8. In the situation shown in FIG. 3B the liquid sump 6 of the brake compartment 5 holds no liquid 15 or almost no liquid 15, thereby significantly reducing the drag exerted on the rotating friction plates 8 with respect to the situation depicted in FIG. 3A.

In order to re-fill the liquid sump 6 of the brake compartment 5, liquid 15 held in the liquid reservoir 10, as shown in FIG. 3B, may be discharged back into the liquid sump 6 of the brake compartment 5 via an inlet valve device 22 which selectively fluidly connects the liquid reservoir 10 with the brake compartment 5 or with the liquid sump 6 of the brake compartment 5. The fluid connection between the liquid reservoir 10 and the brake compartment 5 provided by the inlet valve device 22 is different from the fluid connection between the liquid reservoir 10 and the brake compartment 10 provided by the drain channels 11.

Figure 4A:
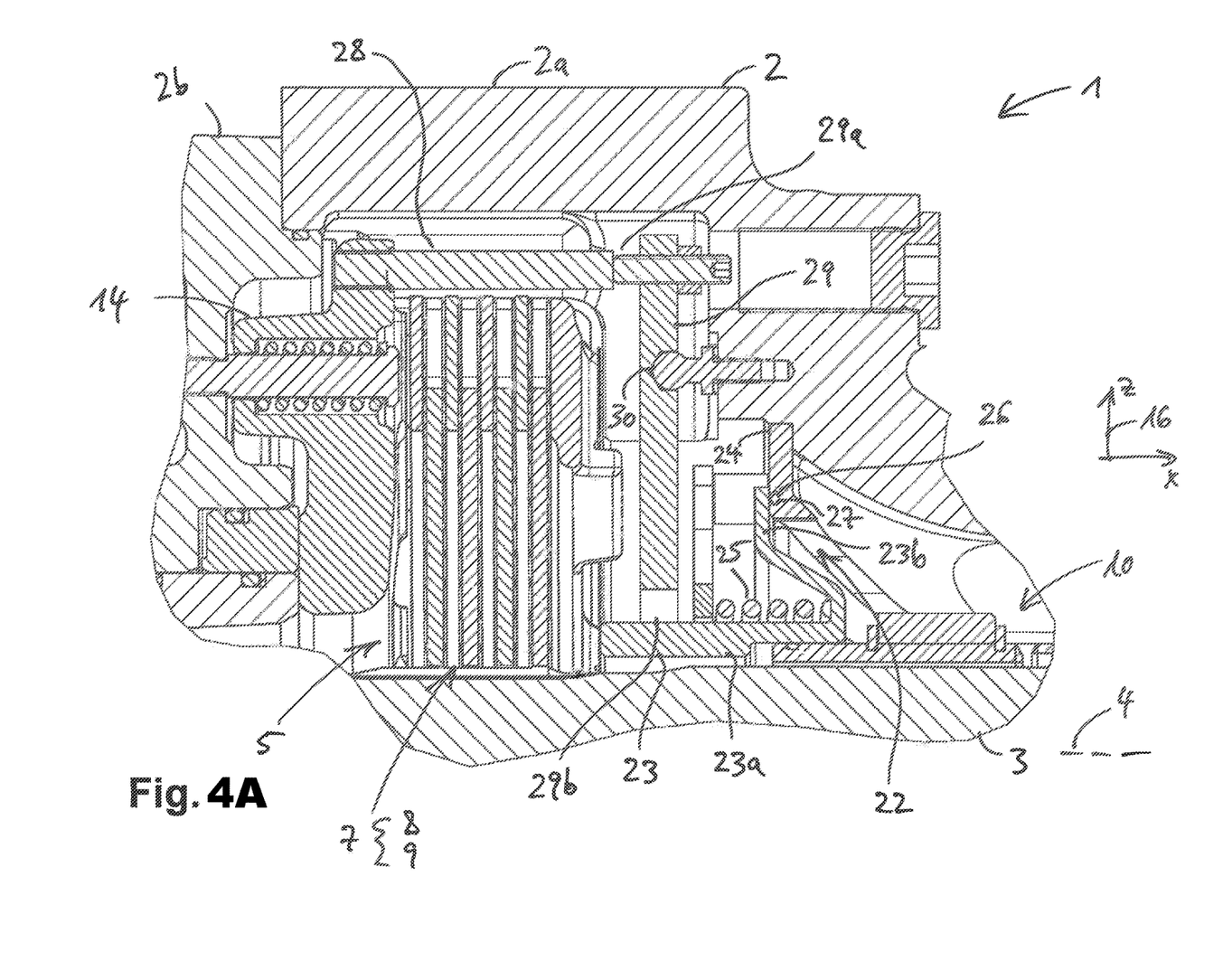
FIG. 4A schematically shows a sectional view of the wet brake system of FIG. 1 with an inlet valve device in a closed position, wherein the sectional plane is arranged perpendicular to an axis of rotation of the wet brake system.
Figure 4B:
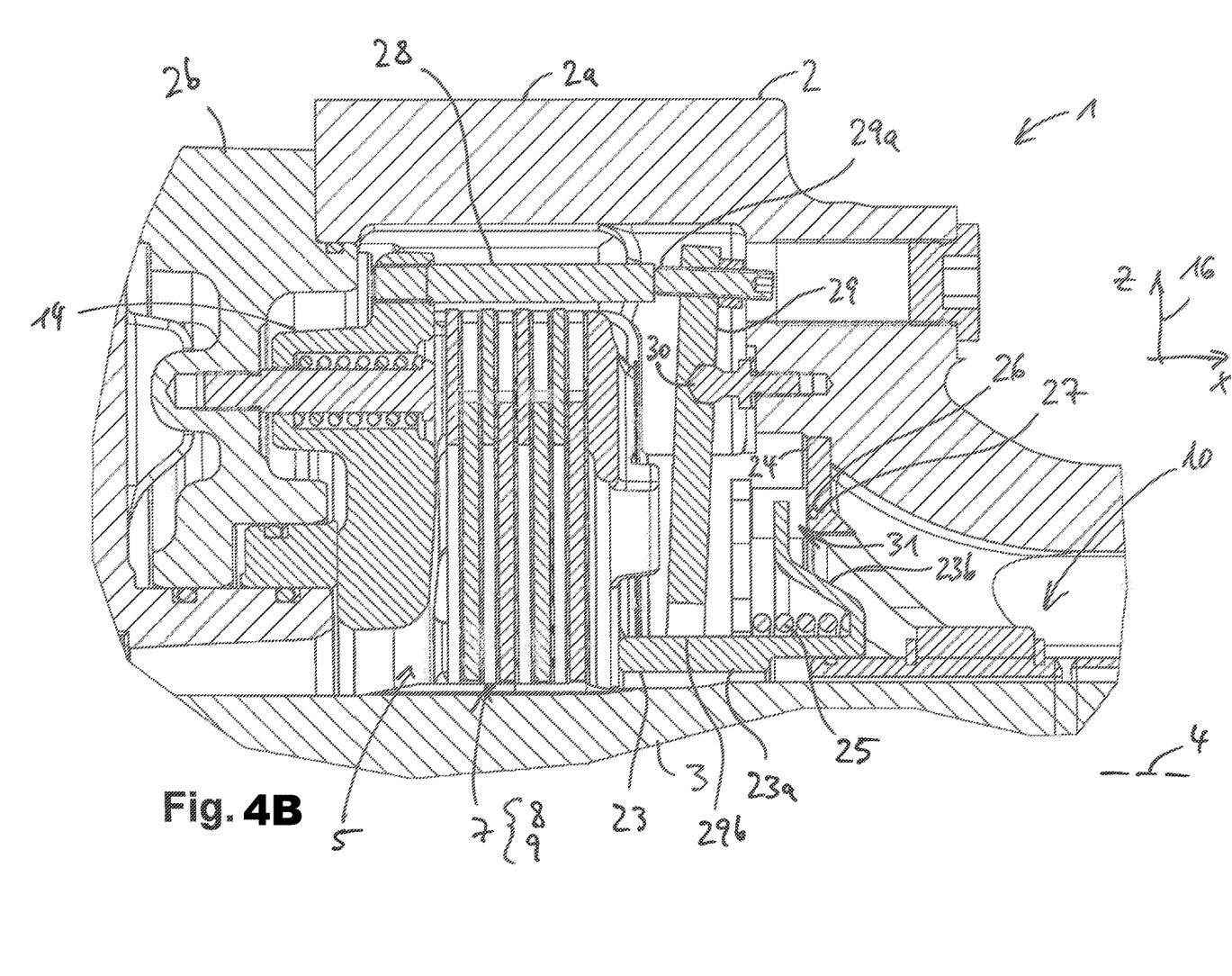
FIG. 4B schematically the sectional view of FIG. 3A with the inlet valve device in an open position.

A detailed view of an embodiment of the inlet valve device 22 is shown in FIGS. 4A and 4B. FIG. 4A shows the inlet valve device 22 in a closed position in which the inlet valve device 22 interrupts fluid communication between the liquid reservoir 10 and the brake compartment 5. And FIG. 4B shows the inlet valve device 22 in an open position in which the inlet valve device 22 interrupts fluid communication between the liquid reservoir 10 and the brake compartment 5.

As shown in FIGS. 4A and 4B, the inlet valve device 22 includes a movable member 23 that can be moved back and forth along or in parallel to the axis of rotation 4, thereby providing selective fluid communication between the liquid reservoir 10 and the brake compartment 5. In the embodiment depicted in the Figures, the inlet valve device 22 including the movable member 23 and the brake piston 14 are disposed on axially opposite sides of the plate pack 7. It is understood that in an alternative embodiment the brake piston 14 and the inlet valve device 22 may be disposed axially on the same side of the plate pack 7. The movable member 23 is disposed axially between the plate pack 7 and the liquid reservoir 10 or between the brake compartment 5 and the liquid reservoir 10. The movable member 23 has an axially extending tube portion 23a and a radially extending annular portion 23b connected to and extending radially from the tube portion 23a. The annular portion 23b has a flat surface arranged perpendicular to the axis of rotation 4. The tube portion 23a is disposed around the shaft 3. The shaft 3 reaches through the tube portion 23a. The tube portion 23a of the movable member is disposed concentrically with respect to the axis of rotation 4. A maximum radius of the radially extending annular portion 23b is larger than a maximum radius of the axially extending tube portion 23a.

Axial movement of the movable member 23 is restricted by a mechanical stop 24 which is fixed with respect to the housing 2. The mechanical stop has a flat surface arranged perpendicular to the axis of rotation 4. A closing spring 25 biases the movable member 23 toward the mechanical stop 24 and toward the closed position of the inlet valve device 22. More specifically, the closing spring 25 biases the flat surface of the annular portion 23b against the flat surface of the mechanical stop 24. The closing spring 25 is disposed on an outer surface of the tube portion 23a facing away from the axis of rotation 4 of the shaft 3. The closing spring 25 is disposed concentrically with respect to the axis of rotation 4.

The flat surface of the mechanical stop 24 comprises a circular notch 26 and a sealing ring 27. The circular notch 26 and the sealing ring 27 are disposed around the shaft 3. The circular notch 26 and the sealing ring 27 are disposed concentrically with respect to the axis of rotation 4. The sealing ring 27 is partially disposed within the circular notch 26. A portion of the sealing ring 27 protrudes out of the circular notch 26 in an axial direction facing the flat surface of the annular portion 23b of the movable member 23. The portion of the sealing ring 27 which protrudes out of the circular notch 26 forms a valve seat for the flat surface of the annular portion 23a of the movable member 23. When the closing spring 25 forces or presses the movable member 23 against the mechanical stop 24 to close the inlet valve device 22, the flat surface of the annular portion 23a of the movable member 23 sealingly engages with the sealing ring 27, thereby interrupting fluid communication between the liquid reservoir 10 and the brake compartment 5.

The movable member 23 of the inlet valve device 22 is mechanically coupled to the axially movable brake piston 14 via an axially extending rod 28 and a radially extending lever portion 29. The lever portion 29 is mounted on a pin 30 which is fixed with respect to the housing 2. The pin 30 defines a pivot axis of the lever portion 29. The pivot axis is arranged perpendicular with respect to the axis of rotation 4. The rod 28 is pivotally coupled to a first point 29a at or near a first end of the lever portion 29, and the movable member 23 is pivotally coupled to a second pivot point 29b at or near a second end of the lever portion 29. The pivot points 29a, 29b may be disposed at different distances from the pivot axis defined by the pin 30 so that a given displacement of the brake piston 14 may result in a displacement of the movable member 23 that may be larger or smaller than the displacement of the brake piston 14. In the embodiment depicted in the Figures, a given displacement of the brake piston 14 results in a displacement of the movable member 23 that is about four times the displacement of the brake piston 14.

As the brake piston 14 is moved in the axial direction to frictionally engage the plates 8, 9 of the plate pack 7, the mechanical coupling between the brake piston 14 and the movable member 23 provided by the lever portion 29 forces the movable member 23 to move in an axially opposite direction against the closing force of the closing spring 25.

Concurrently, the flat surface of the annular portion 23a of the movable member 23 lifts off the flat surface of the mechanical stop 24 and the sealing ring 27, thereby opening the inlet valve device 22 by leaving a clearance 31 between the flat surface of the annular portion 23a of the movable member 23 and the flat surface of the mechanical stop 24. The clearance 31 forms an inlet port through which liquid held in the liquid reservoir 10 may be discharged into the liquid sump 6 of the brake compartment 5.

Note that although the clearance 31 depicted in FIG. 4B is disposed above the axis of rotation 4 in the vertical direction 16, the cylindrical symmetry of the annular portion 23a of the movable member 23 and of the flat surface of the mechanical stop 24 simultaneously produces a similar clearance 31 below the axis of rotation 4, as shown in FIG. 3A, for example.

In the vertical direction 16, the liquid reservoir 10 is at least partially disposed above the inlet port defined by the clearance 31. Here, the clearance 31 defining the inlet port is at least partially disposed below the axis of rotation 4. Further, in the vertical direction 16 the clearance 31 defining the inlet port is at least partially disposed at the same distance 21 above the floor 17 of the brake compartment 5 as the floor 20 of the liquid reservoir 10. It is understood that in alternative embodiments the clearance 31 defining the inlet port may be at least partially disposed above or below the floor 20 of the liquid reservoir 10. As the liquid reservoir 10 is at least partially disposed above the inlet port defined by the clearance 31, liquid 15 held within the liquid reservoir 10 may flow from the liquid reservoir 10 and into the liquid sump 6 of the brake compartment 5 via the clearance 31 under the influence of gravity or solely under the influence of gravity.

Figures 5A, 5B:
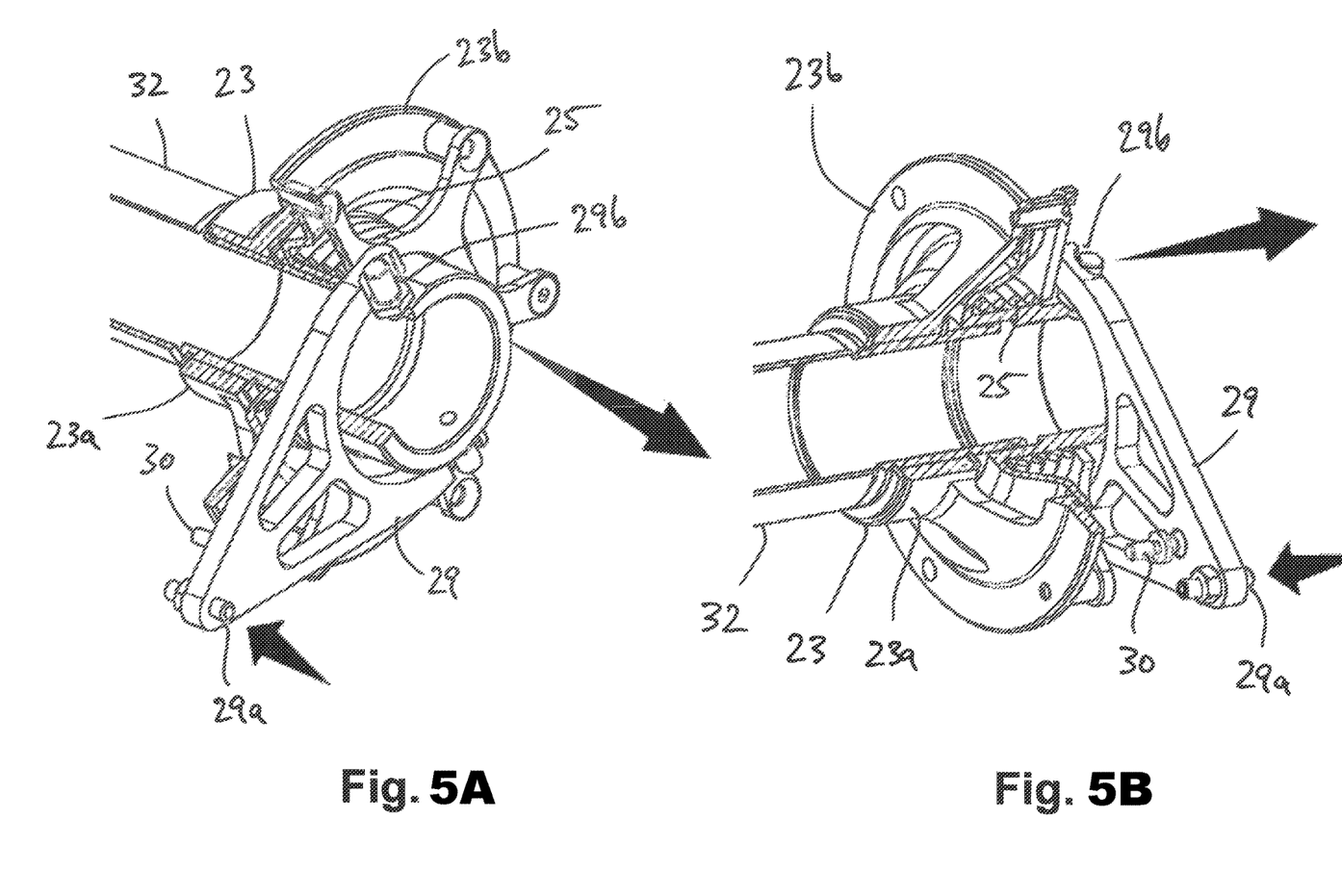
FIG. 5A schematically shows a perspective view of the inlet valve device of the wet brake system of FIG. 1.
FIG. 5B schematically shows another perspective view of the inlet valve device of the wet brake system of FIG. 1.

FIGS. 5A and 5B illustrate a perspective view of the coupling mechanism between the brake piston 14 and the movable member 23. Specifically, FIGS. 5A and 5B depict the lever portion 29, the first pivot point 29a and the second pivot point 29b, the pin 30 defining the pivot axis of the lever portion 29, the movable member 23 including the tube portion 23a and the annular portion 23b, the closing spring 25 coupled to the movable member 23, and the tube shaft 32.

Figure 6:
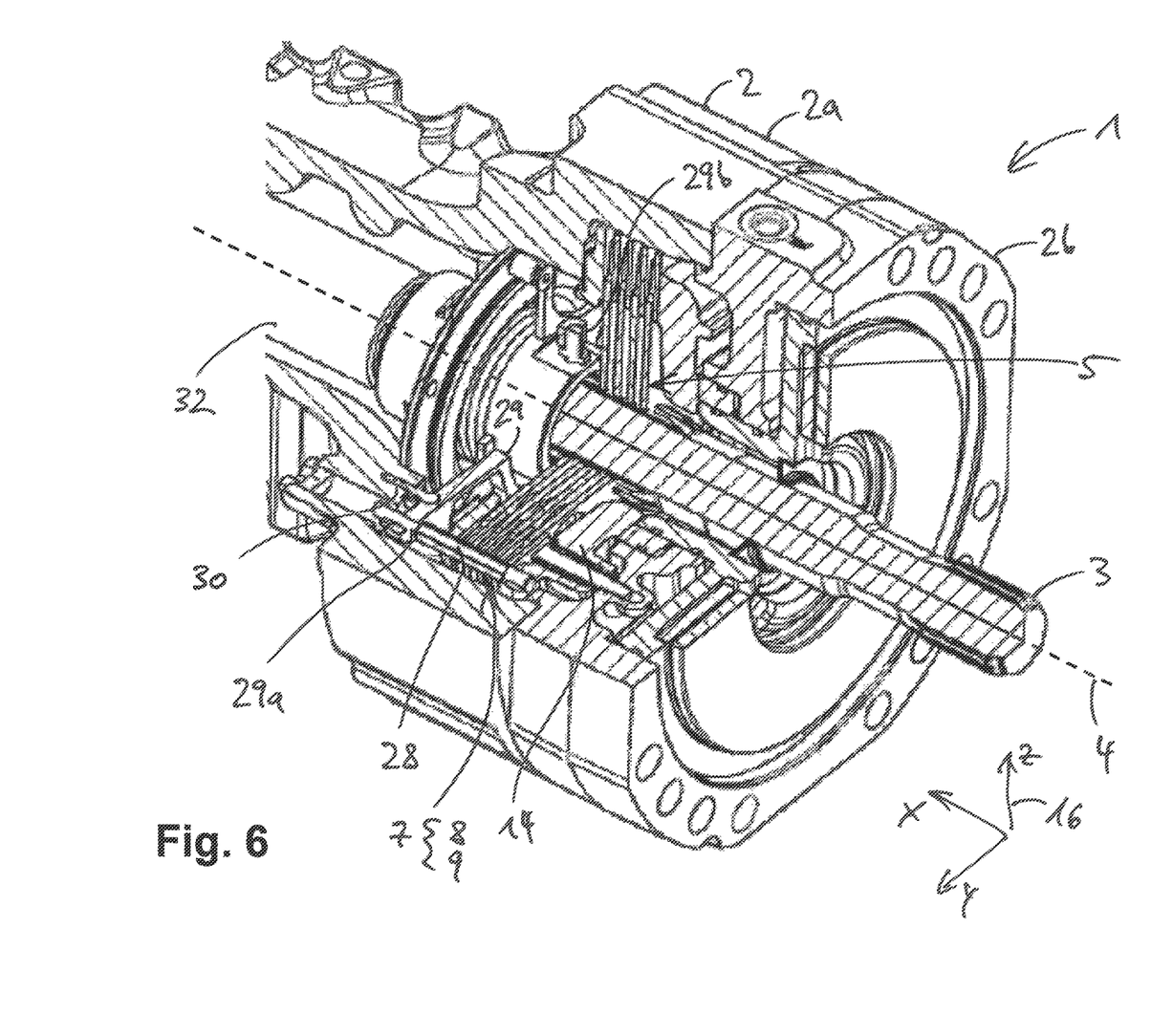
FIG. 6 schematically shows another cutaway perspective view of the wet brake system of FIG. 1.

FIG. 6 shows another perspective cutaway view of the wet brake system 1.

It is understood that in alternative embodiments the inlet valve device providing selective fluid communication between the liquid reservoir 10 and the brake compartment 5 and the actuation mechanism for actuating the inlet valve device may be configured differently that described herein. For example, in alternative embodiments inlet valve device may be configured to be actuated by means of electromagnetic forces. Also, in alternative embodiments the inlet valve device may not be mechanically coupled with the brake piston or may not be coupled to the brake piston at all. For example, it is conceivable that the inlet valve device is actuated before or well before a braking operation.

To name just one example, the wet brake system may include a navigation system that is configured to predict that a braking operation is likely to be performed within a predetermined amount of time. For instance, the navigation system may predict that the vehicle is about to drive around a curve and will need to reduce its current speed. The navigation system may then command the inlet valve device to open and the allow liquid from the liquid reservoir 30 to be discharged into the brake compartment 5 so that a sufficient amount of liquid 15 can be accumulated in the brake compartment 5 before the braking operation is initiated.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Throughout this specification relative language such as the words 'about' and 'approximately' may be used. Unless otherwise specified or described, this language seeks to incorporate at least 10% variability to the specified number or range. That variability may be plus 10% or negative 10% of the particular number specified.

The foregoing description is considered as illustrative only of the principles of the described embodiments. Further, since numerous modifications and changes will readily occur to those skilled in the art, it is not desired to limit the described embodiments to the exact construction and processes shown and described herein. Accordingly, all suitable modifications and equivalents may be considered as falling within the scope of the described embodiments as defined by the claims which follow.

The invention claimed is:

1. A wet brake system, comprising:
    a housing enclosing a brake compartment configured to hold a liquid;
    a rotatable shaft disposed in and surrounded by a shaft tube arranged within the housing;
    at least one friction plate rotatably disposed within the brake compartment;
    at least one separator plate disposed within the brake compartment, coupled to the housing and configured to be frictionally engaged with the at least one friction plate for braking the at least one friction plate, the at least one friction plate and the at least one separator plate configured to be at least partially submersed in a liquid held within the brake compartment;
    a liquid reservoir disposed circumferentially about the rotatable shaft and in fluid communication with the brake compartment via a drain channel, the drain channel ending in a drain port disposed in the brake compartment, wherein the drain port is arranged such that the at least one friction plate when rotating is configured to convey liquid held within the brake compartment to the liquid reservoir via the drain port and the drain channel for draining the brake compartment, and wherein the liquid reservoir is positioned at least partially above a lower portion of the brake compartment so that liquid may flow from the liquid reservoir into the lower portion of the brake compartment under the influence of gravity;

a first actuator for selectively frictionally engaging the at least one separator plate with the at least one friction plate;

a second actuator for selectively fluidly connecting the liquid reservoir with the brake compartment; and a coupling mechanism coupling the first actuator with the second actuator, wherein the first actuator and the second actuator are pivotably coupled via a lever portion of the coupling mechanism, wherein the coupling mechanism is configured such that when the first actuator actuates the at least one separator plate to frictionally engage with the at least one friction plate, the second actuator actuates so as to fluidly connect the liquid reservoir with the brake compartment to allow liquid held in the liquid reservoir to flow into the brake compartment.

2. The wet brake system of claim 1, wherein the at least one friction plate defines an axis of rotation and wherein a coupling between the at least one separator plate and the housing is configured to allow the at least one separator plate to move in the axial direction and provides a torque proof connection between the at least one separator plate and the housing with respect to the axis of rotation.

3. The wet brake system of claim 1, wherein the drain port is disposed above a floor of the brake compartment, the floor of the brake compartment defining a lowermost portion of the brake compartment.

4. The wet brake system of claim 3, wherein the at least one friction plate defines an axis of rotation and wherein the drain port is disposed above the axis of rotation with respect to the floor of the brake compartment.

5. The wet brake system according to claim 1, further comprising a deflector element arranged near a perimeter of the at least one friction plate, the deflector element configured to deflect liquid toward the drain port.

6. The wet brake system of claim 1, wherein the at least one friction plate defines an axis of rotation and wherein an axial position of the drain port overlaps with an axial position of the at least one friction plate.

7. The wet brake system of claim 1, wherein the drain port is disposed at least partially above the liquid reservoir so that liquid conveyed to the drain port may flow from the drain port into the liquid reservoir under the influence of gravity.

8. The wet brake system of claim 1, wherein the liquid reservoir is in fluid communication with the brake compartment via an inlet valve device which selectively fluidly connects the liquid reservoir with the brake compartment.

9. The wet brake system of claim 8, wherein the inlet valve device has an open position defining an inlet port in fluid communication with or disposed in the brake compartment, wherein the liquid reservoir is disposed at least partially above the inlet port so that liquid may flow from the liquid reservoir into the brake compartment under the influence of gravity.

10. The wet brake system of claim 9, wherein the second actuator is configured for selectively opening the inlet valve device to fluidly connect the liquid reservoir with the brake compartment.

11. The wet brake system of claim 10, wherein the inlet valve device comprises a normally closed valve and wherein the coupling mechanism is configured such that when the first actuator actuates the at least one separator plate to frictionally engage with the at least one friction plate, the second actuator actuates the inlet valve device to fluidly connect the liquid reservoir with the brake compartment to allow liquid held in the liquid reservoir to fill the brake compartment via the inlet port.

12. The wet brake system of claim 1, wherein the rotatable shaft is connected to the at least one friction plate or connectable to the at least one friction plate.

13. A vehicle, comprising a vehicle wheel and a wet brake system according to claim 1, wherein the at least one friction plate of the wet brake system is connected to or in driving engagement with the vehicle wheel.

14. The vehicle of claim 13, further comprising a deflector element arranged near a perimeter of the at least one friction plate, the deflector element configured to deflect liquid toward the drain port.

15. The vehicle of claim 13, wherein the at least one friction plate defines an axis of rotation and wherein an axial position of the drain port overlaps with an axial position of the at least one friction plate.

16. The vehicle of claim 13, wherein the drain port is disposed above a floor of the brake compartment, the floor of the brake compartment defining a lowermost portion of the brake compartment.

17. The vehicle of claim 16, wherein the at least one friction plate defines an axis of rotation and wherein the drain port is disposed above the axis of rotation with respect to the floor of the brake compartment.

18. A method of operating the wet brake system according to claim 1, the method comprising the steps:

when or before frictionally engaging the at least one separator plate with the at least one friction plate, fluidly connecting the liquid reservoir with the brake compartment to allow liquid held in the liquid reservoir to fill the brake compartment; and when disengaging the at least one separator plate and the at least one friction plate, rotating the at least one friction plate to convey liquid held in the brake compartment to the liquid reservoir via the drain port and the drain channel to drain the brake compartment.

19. The method of claim 18, wherein the drain port is disposed above a floor of the brake compartment, the floor of the brake compartment defining a lowermost portion of the brake compartment, wherein the at least one friction plate defines an axis of rotation and wherein the drain port is disposed above the axis of rotation with respect to the floor of the brake compartment, the wet brake system further comprising a deflector element arranged near a perimeter of the at least one friction plate, the deflector element configured to deflect liquid toward the drain port, and wherein an axial position of the drain port overlaps with an axial position of the at least one friction plate.

* * * * *